United States Patent
Choi

(10) Patent No.: US 8,466,972 B2
(45) Date of Patent: Jun. 18, 2013

(54) DIGITAL IMAGE PROCESSING APPARATUS TO PROVIDE AN OUT-OF-FOCUS EFFECT

(75) Inventor: Jun-kwon Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 398 days.

(21) Appl. No.: 12/691,106

(22) Filed: Jan. 21, 2010

(65) Prior Publication Data

US 2010/0182492 A1    Jul. 22, 2010

(30) Foreign Application Priority Data

Jan. 22, 2009   (KR) .................. 10-2009-0005573

(51) Int. Cl.
*H04N 5/228*   (2006.01)
*G03B 17/00*   (2006.01)

(52) U.S. Cl.
USPC ........................... 348/208.99; 396/55

(58) Field of Classification Search
USPC ........................... 348/294–308, 208.99–208.5
See application file for complete search history.

(56) References Cited

U.S. PATENT DOCUMENTS

2008/0297922 A1* 12/2008 Lule .............................. 359/824
2009/0040317 A1*  2/2009 Park et al. .................. 348/208.2

* cited by examiner

*Primary Examiner* — Sinh Tran
*Assistant Examiner* — Selam Gebriel
(74) *Attorney, Agent, or Firm* — Drinker Biddle & Reath LLP

(57) ABSTRACT

Provided is a digital image processing apparatus that realizes an out-focusing effect by tilting a photographing device about a plane that is perpendicular to an optical axis of a lens. The digital image processing apparatus includes a lens and a photographing device configured to generate data about an image from light which has passed through the lens. The photographing device is configured to be tilted about a plane perpendicular to an optical axis of the lens. The photographing device is tilted about the plane perpendicular to the optical axis of the lens so as to control a range of a focus area formed on the photographing device.

10 Claims, 7 Drawing Sheets

DIGITAL IMAGE PROCESSING APPARATUS TO PROVIDE AN OUT-OF-FOCUS EFFECT

CROSS-REFERENCE TO RELATED PATENT APPLICATION

This application claims the benefit of Korean Patent Application No. 10-2009-0005573, filed on Jan. 22, 2009, in the Korean Intellectual Property Office, the entire contents of which are incorporated herein in by reference.

BACKGROUND OF THE INVENTION

1. Field of the Invention

The present invention relates to a digital image processing apparatus, and more particularly, to a digital image processing apparatus that realizes an out-focusing effect by tilting a photographing device.

2. Description of the Related Art

Conventionally, digital image processing apparatuses, such as digital cameras, personal digital assistants (PDAs), phone cameras, and personal computer (PC) cameras, process images captured by the apparatuses, or employ motion recognition sensors. A conventional digital image processing apparatus receives a desired image through a photographing device, displays the received image on an image display device, stores the received image as an image file as selected by a user, and can print the stored image file.

In the conventional digital image processing apparatus, various methods for realizing an out-focusing effect have been developed. The out-focusing effect is a photographing technique in which an unnecessary background is focused-out (that is, photographed unclearly) and a subject to be emphasized is focused-in (that is, photographed clearly) so as to display the subject clearly.

The following ways have been used in order to realize the out-focusing effect.

First, a bright large diameter lens is used. That is, an out-focusing effect is realized by using the bright large diameter lens that forms a low depth. When the bright large diameter lens is used, the most excellent out-focusing effect can be obtained. However, the bright large diameter lens generally has a weight of more than 3 kg, and thus cannot be easily carried, and also costly.

And a way of digitally realizing an out-focusing effect has been also developed. An image is blurred by performing a blurring treatment on a region except for a main subject. However, when an out-focusing effect is realized digitally, a user cannot easily make a region to be out-focused and a region on which a blurring treatment is to be actually performed the same, and the quality of the digitally-generated out-focusing is extremely reduced as compared to optically-generated out-focusing.

SUMMARY OF THE INVENTION

The present invention provides a digital image processing apparatus that realizes an out-focusing effect by tilting a photographing device to a plane that is perpendicular to an optical axis of a lens group.

According to an aspect of the present invention, there is provided a digital image processing apparatus including a lens; and a photographing device configured to generate data about an image from light which has passed through the lens, where the photographing device is configured to be tilted about a plane perpendicular to an optical axis of the lens.

The photographing device may be tilted about the plane perpendicular to the optical axis of the lens so as to control a range of a focus area formed on the photographing device.

The digital image processing apparatus may include a base formed to face the photographing device; one elastic member interposed between the photographing device and the base; and a pair of magnetic members, wherein one member is disposed on the surface of the photographing device and the other member is disposed on the base, the pair of magnetic members configured to face each other.

The pair of magnetic members may apply a magnetic force so that the photographing device is tilted toward the base.

One member of the pair of magnetic members may be an electromagnet, and the other of the pair of magnetic members is a permanent magnet; and the photographing device is tilted toward the base by the application of current to the electromagnet.

The elastic member may apply an elastic force in a direction to bring the photographing device to return to an original position of the photographing device.

The digital image processing apparatus may include another pair of magnet members, wherein one member of the another pair of magnetic member is disposed on the surface of the photographing device and the other member of the another pair of magnet members is disposed on the base, the another pair of magnetic members configured to face each other; another elastic member configured to wherein the another elastic member applies an elastic force in a direction to bring the photographing device to return to an original position of the photographing device; and wherein the pair of magnet members may be configured to tilt the photographing device about a first plane perpendicular to the base and the another pair of magnet members is configured to tilt the photographing device about a second plane perpendicular to the base.

A digital image processing apparatus is provided that includes a base; a rotation axis disposed on the base; a photographing device supporting member disposed on the base; a sensor plate disposed on the rotation axis and the photographing device supporting member so as to be parallel to the base; and a photographing device mounted on the sensor plate and converting light energy into an electrical signal, wherein the sensor plate and the photographing device may be formed to be tilted toward the base.

The photographing device may be configured to be tilted toward the base, so as to control a range of a focus area formed on the photographing device.

The rotation axis may be formed in a spherical joint shape, and the sensor plate and the photographing device tilt about the rotation axis.

The photographing device supporting member may be disposed to contact a part of the sensor plate.

The digital image processing apparatus may include a pair of magnetic members, wherein one member is disposed on the surface of the photographing device and the other member is disposed on the base, the pair of magnetic members configured to face each other, wherein the pair of magnetic members is configured to apply a magnetic force to tilt the photographing device toward the base.

One member of the pair of magnetic members may be an electromagnet, and the other one of the pair of magnetic members may be a permanent magnet; and the pair of magnet members may be configured so that when current is applied to the electromagnet, the photographing device is tilted toward the base by magnetism occurring between the electromagnet and the permanent magnet.

An elastic member is disposed between the photographing device supporting member and the sensor plate, and the elastic member applies an elastic force in a direction to bring the photographing device to return to an original position of the photographing device.

The digital image processing apparatus may include another pair of magnet members, wherein one member of the another pair of magnetic member may be disposed on the surface of the photographing device and the other member of the another pair of magnet members may be disposed on the base. The another pair of magnetic members may be configured to face each other. The another elastic member may be configured to apply an elastic force in a direction to bring the photographing device to return to an original position of the photographing device; and the pair of magnet members may be configured to tilt the photographing device about a first plane perpendicular to the base and the another pair of magnet members may be configured to tilt the photographing device about a second plane perpendicular to the base.

A digital image processing apparatus including a first base; a first photographing device supporting member and a second photographing device supporting member which are disposed on the first base; a first sensor plate disposed between the first photographing device supporting member and the second photographing device supporting member so as to be substantially parallel to the first base; and a photographing device mounted on the first sensor plate and configured to convert light energy into an electrical signal; wherein the first sensor plate and the photographing device may be formed to be tilted toward the first base.

The photographing device may be configured to tilt toward the first base, so as to control a range of a focus area formed on the photographing device.

A first rotation axis is formed by connections to two side portions of the first sensor plate, and the first sensor plate may be configured to tilt about the first rotation axis.

The first photographing device supporting member and the second photographing device supporting member may be formed in an "L" shape, and the other is formed in an upside down "L" shape; and the first sensor plate may be disposed between the first photographing device supporting member and the second photographing device supporting member.

The first photographing device supporting member and the second photographing device supporting member may be respectively disposed to contact one of both end portions of the first sensor plate.

The digital image processing apparatus may include a pair of magnetic members, wherein one member is disposed on the surface of the first sensor plate and the other member is disposed on the first photographing device supporting member, the pair of magnetic members configured to face each other, wherein the pair of magnetic members apply a magnetic force so that the first sensor plate tilts.

One member of the pair of magnetic members may be an electromagnet, and the other of the pair of magnetic members may be a permanent magnet; and the first sensor plate is tilted by repulsion between the electromagnet and the permanent magnet.

The digital image processing apparatus may include an elastic member, the elastic member may be disposed between the first sensor plate and the second photographing device supporting member, and the elastic member may be configured to apply an elastic force in a direction to return the photographing device to an original position.

The digital image processing apparatus may include a second base, wherein the first base is mounted on the second base; a third photographing device supporting member and a fourth photographing device supporting member which are disposed on the second base; and a second sensor plate disposed between the third photographing device supporting member and the fourth photographing device supporting member so as to be substantially parallel to the second base. The second sensor plate may be configured to tilt toward the second base.

A second rotation axis may be formed by connections to two side portions of the second sensor plate, and the second sensor plate is configured to tilt about the second rotation axis.

One of the third photographing device supporting member and the fourth photographing device supporting member may be formed in a "L" shape, and the other may be formed in an upside down "L" shape, and the second sensor plate may be disposed between the third photographing device supporting member and the fourth photographing device supporting member.

The third photographing device supporting member and the fourth photographing device supporting member may be respectively disposed to contact one of both end portions of the second sensor plate.

The digital image processing apparatus may include a pair of magnetic members, wherein one member is disposed on the surface of the second sensor plate and the other member is disposed on the surface of the third photographing device supporting member. The pair of magnetic members may be configured to face each other, and the pair of magnetic members may be configured to apply a magnetic force to tilt the photographing device.

One member of the pair of magnetic members may be an electromagnet, and the other member of the pair of magnetic members may be a permanent magnet; and the photographing device may be tilted by repulsion between the electromagnet and the permanent magnet.

At least one elastic member may be disposed between the second sensor plate and the fourth photographing device supporting member, and the at least one elastic member may apply an elastic force in a direction to bring the photographing device to an original position.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore there is a need in the art for a digital image processing apparatus including a lens, and a photographing device configured to generate data about an image from light which has passed through the lens with the photographing device configured to tilt about a plane perpendicular to an optical axis of the lens.

Hereinafter, the present invention will be described in detail by explaining exemplary embodiments of the invention with reference to the attached drawings.

Figure 1:
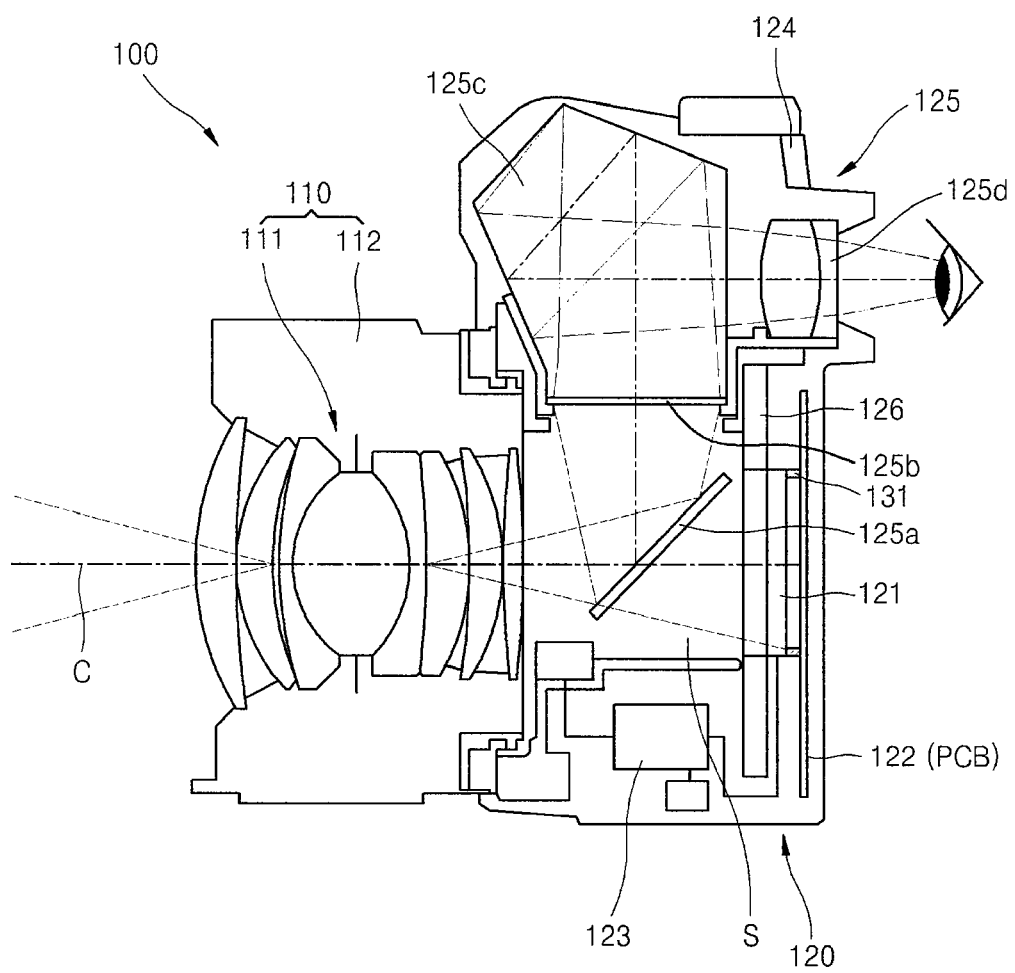
FIG. 1 is a cross-sectional side view illustrating an example of an internal constitution of a digital image processing apparatus according to an embodiment of the present invention.
Figure 2:
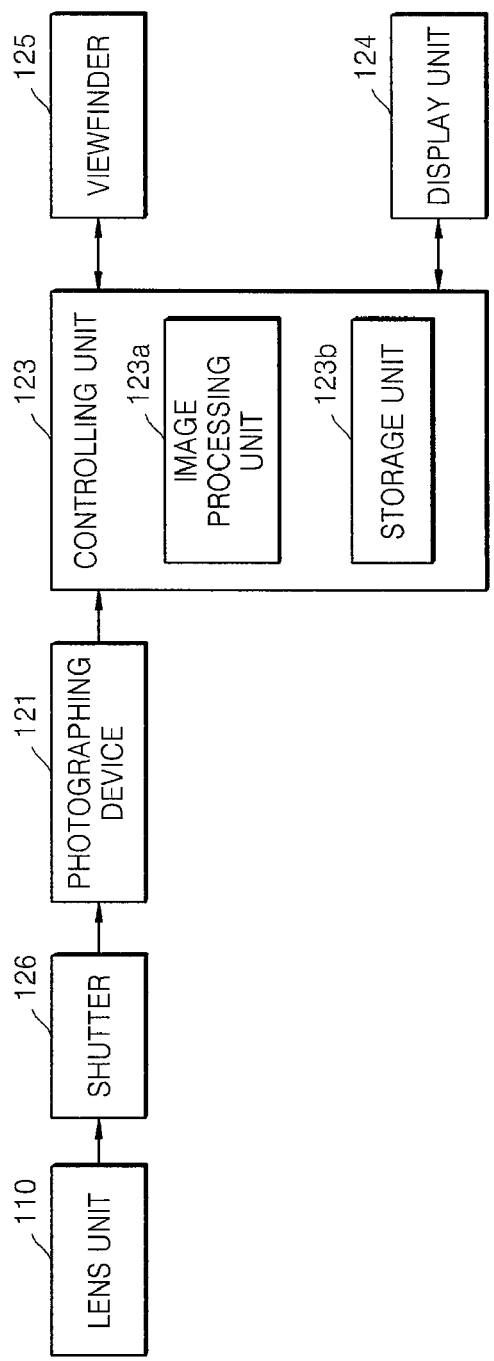
FIG. 2 is a block diagram illustrating an example of a connection between a controlling unit and components of the digital image processing apparatus of FIG. 1.

FIG. 1 is a cross-sectional side view illustrating an example of an internal constitution of a digital image processing apparatus 100 according to an embodiment of the present invention. FIG. 2 is an example of a block diagram illustrating a connection between a controlling unit 123 and components of the digital image processing apparatus 100 of FIG. 1.

The digital image processing apparatus 100 according to the current embodiment is a single-lens reflex camera and is a digital camera having a removable lens.

The digital image processing apparatus 100 roughly includes a lens unit 110 and a body 120.

The lens unit 110, including a lens group 111 and a lens frame 112, transmits the image light of a subject to the body 120.

The lens group 111 that includes a plurality of optical lenses, an iris, etc., is installed in the lens frame 112.

The body 120 includes a photographing device 121, the controlling unit 123, a display unit 124, a viewfinder 125, a shutter 126, a printed circuit board (PCB) 122 and a tilting member 131.

The photographing device 121 is disposed in a location where the image light that has passed through the lens unit 110 is focused as a picture image, and converts the focused picture image into an electrical signal.

The photographing device 121 may be a charge-coupled device (CCD), but the present invention is not limited thereto. That is, the photographing device 121 according to the present invention may be a complementary metal oxide semiconductor (CMOS) or another image sensor.

The controlling unit 123 is electrically connected to the photographing device 121, and performs the main functions of the digital image processing apparatus 100, for example, photographing a subject, controlling the photographing device 121, and the like.

The controlling unit 123 roughly includes an image processing unit 123a and a storage unit 123b.

The image processing unit 123a converts an analog signal of the image received from the photographing device 121 into a digital signal, and then, performs gamma correction on the digital signal and performs signal processing on the digital signal so as to store the digital signal.

The storage unit 123b stores the captured image and an operation program of the controlling unit 123. For this, the storage unit 123b may be formed of a semiconductor memory device such as a synchronous dynamic random access memory (SDRAM).

The display unit 124 displays state information of the digital image processing apparatus 100. That is, the display unit 124 may be composed of a liquid crystal display (LCD) to display the state information of the digital image processing apparatus 100.

In the current embodiment, the display unit 124 is composed of an LCD. Other examples of the display unit 124 include an organic light-emitting diode, a field emission display (FED), or the like.

In the current embodiment, the display unit 124 displays a captured image. In other examples, the display unit 124 may display not only the state of the digital image processing apparatus 100 but also the captured image or an image to be captured.

The viewfinder 125 changes a path of light which has passed through the lens unit 110 to provide the path to a user, so that the user can observe a subject while photographing by using the digital image processing apparatus 100.

The viewfinder 125 is disposed on the light path through which the image light which has passed through the lens unit 110 passes, and includes a mirror 125a that changes the path of the image light, a focus screen 125b that controls a focus of the image light changed by the mirror 125a, a prism 125c that changes the path of the image light which has passed through the focus screen 125b, and an ocular 125d that receives the image light radiated from the prism 125c and transmits the image light to a user.

The prism 125c illustrated in FIG. 1 is a pentagonal prism. The prism 125c changes the image light, which has passed through the focus screen 125b, nearly at a right angle, so that the image light faces the ocular 125d disposed in the rear of the body 120.

In the current embodiment, the image focused on the photographing device 121 and the image shown by the viewfinder 125 are the same. However, in other examples they may be different.

The shutter 126 disposed in front of the photographing device 121 controls the amount of the image light when photographing.

The photographing device 121, a central processing unit (CPU) that controls all operations of the digital image processing apparatus 100, a digital signal processor, etc. are attached to the PCB 122.

The tilting member 131 is disposed between the photographing device 121 and the PCB 122. The photographing device 121 can be tilted through the tilting member 131 about a plane that is perpendicular to an optical axis C of the lens group 111.

Figure 3:
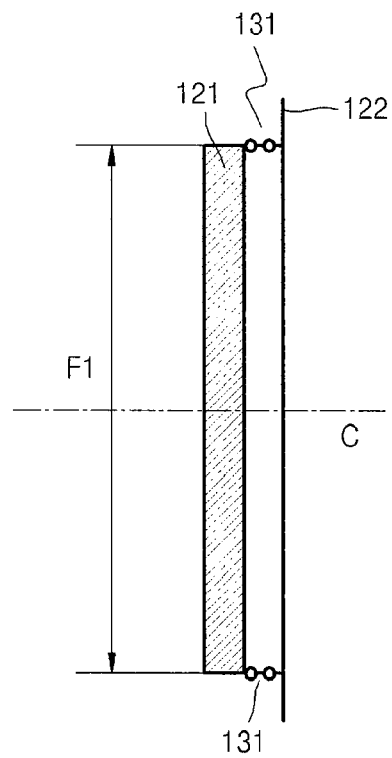
FIG. 3 illustrates an example when a photographing device is disposed to be parallel to a plane that is perpendicular to an optical axis of a lens group.

That is, as the example of FIG. 3 illustrates, when the photographing device 121 is disposed to be parallel to the plane perpendicular to the optical axis C of the lens group 111, a focus is adjusted on the entire area of the photographing device 121. That is, the entire photographing device 121 becomes a focus area F1. Accordingly, an out-focusing effect is not realized, and thus, a clear image is photographed generally.

Figure 4:
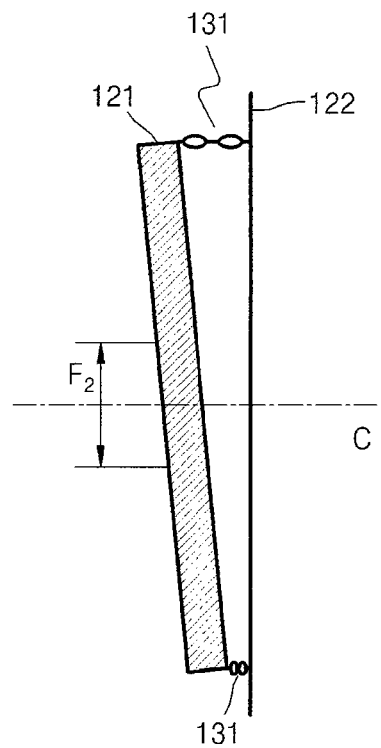
FIG. 4 illustrates an example when the photographing device is tilted through a tilting member to the plane that is perpendicular to an optical axis of a lens group.

On the other hand, as the example of FIG. 4 illustrates, when the photographing device 121 is tilted by the tilting member 131 about a plane perpendicular to the optical axis C of the lens group 111, a focus is adjusted on a partial area of the photographing device 121. That is, only a part of the photographing device 121 becomes a focus area F2. Accordingly, an out-focusing effect is realized, and thus an unnecessary background is photographed unclearly, and a subject to be emphasized is focused-in, that is, photographed clearly. A tilting mechanism of the photographing device 121 will be described in detail with reference to FIGS. 5 through 10.

Hereinafter, an operation of the digital image processing apparatus 100 according to an example of the current embodiment will be described.

First, photographing by the digital image processing apparatus 100 will now be described.

A user determines a subject to be photographed. Then, when the subject is disposed in front of the lens unit 110, image light passes through the lens group 111 of the lens unit 110 and then reaches the mirror 125a. The image light that reached the mirror 125a passes through the focus screen 125b, the prism 125c, and the ocular 125d sequentially in the order stated, and then, reaches the eyes of the user.

The user adjusts a focus on the subject through the viewfinder 125 and presses a shutter button, then the mirror 125a turns from the light path, and the image light is focused on the photographing device 121.

The photographing device 121 converts the focused image into an electrical signal, and the converted electrical signal is transmitted to the image processing unit 123a of the controlling unit 123. The electrical signal transmitted to the image processing unit 123a is an analog signal, which is converted into a digital signal, and then, gamma correction is performed on the digital signal.

The gamma correction is performed to encode data in conformity with the non-linearity characteristics of human vision. That is, the human vision responds nonlinearly with respect to brightness according to Weber's law, thus, when a limited bit depth is given, if the brightness of light is memorized linearly, posterization occurs. Accordingly, in order to display the best image quality under the given bit depth, the information must be encoded using a nonlinear function, and the encoding is called gamma correction.

The image processing unit 123a performs gamma correction on an image signal that is input by a gamma curve, and outputs the image signal. For example, the image processing unit 123a corrects an input luminance level of a 12 bits image signal to that of an 8 bits image signal, and then, outputs the corrected input luminance level.

The image processing unit 123a performs a color filter array (CFA) interpolation that interpolates a Bayer pattern embodied by an RGRG line and a GBGB line of predetermined data that is gamma-corrected to an RGB line. In the CFA interpolation of the image processing unit 123a, three channels of R, G and B are restored such that a G channel is first restored from pixels having only an R or B channel value, and empty values are then filled in the order (or reverse order) of a B channel and an R channel.

The image processing unit 123a converts the interpolated RGB signal into a YUV signal. Then, the image processing unit 123a performs an edge correction whereby a Y-signal is filtered by a high band filter to attain a clear image, and a color correction whereby color values of the U and V-signals are corrected by using standard color coordinates, thereby removing noise thereof.

The image processing unit 123a compresses or signal-processes the noise-removed Y, U and V signals so as to generate a Joint Photographic Coding Experts Group (JPEG) file. The generated JPEG file is stored in the storage unit 123b according to the user's choice, thereby completing photographing.

Hereinafter, a mechanism for tilting a photographing device to a plane perpendicular to an optical axis of a lens group will be described in detail.

Figure 5:
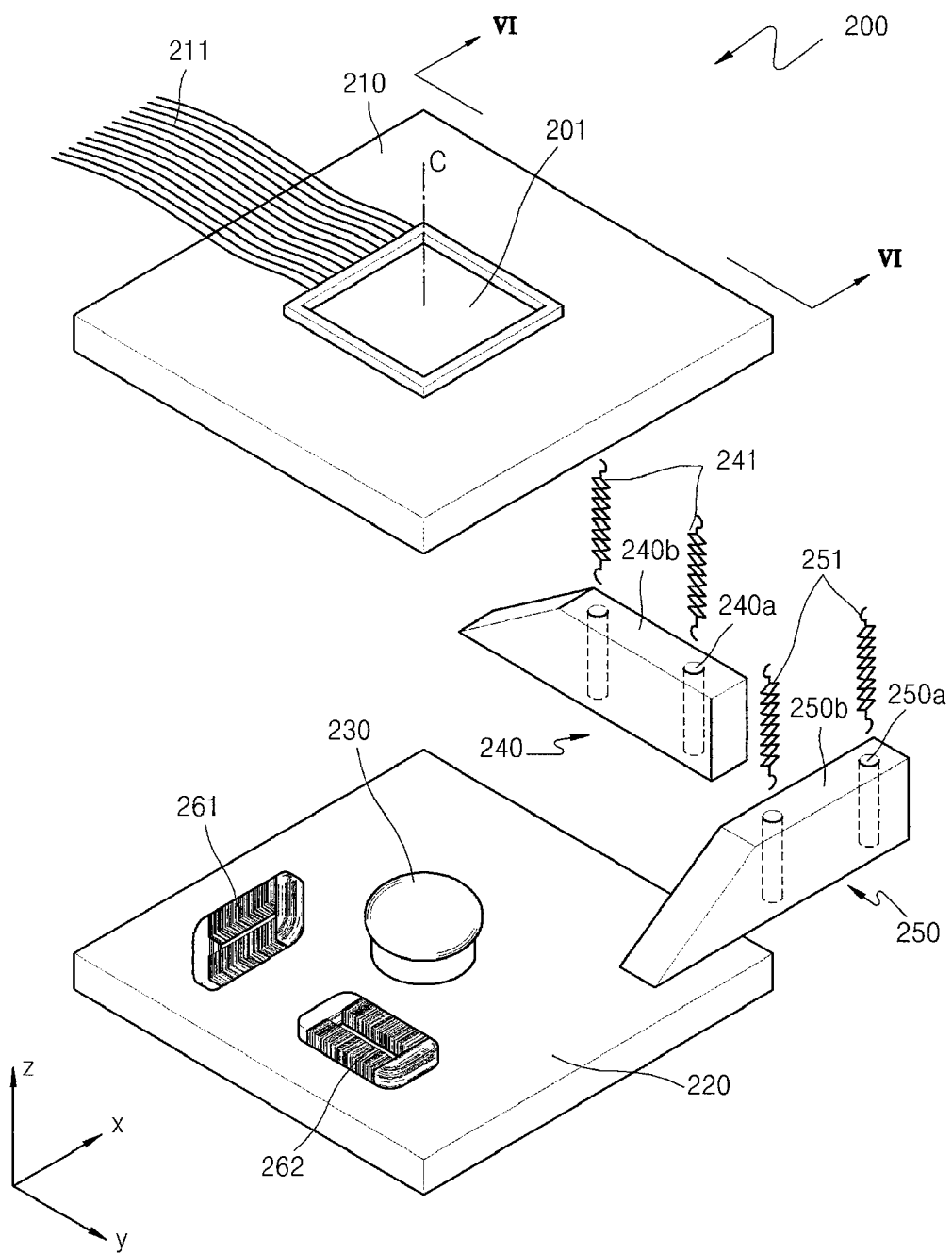
FIG. 5 is an exploded perspective view illustrating an example of a tilting mechanism of a digital image processing apparatus, according to an embodiment of the present invention.
Figure 6:
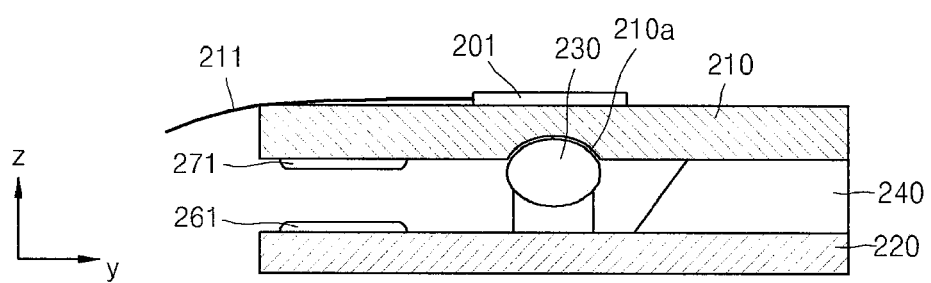
FIG. 6 is an example of a cross-sectional view of FIG. 5.

FIG. 5 is an exploded perspective view illustrating an example of a tilting mechanism 200 of a digital image processing apparatus, according to an embodiment. FIG. 6 is a cross-sectional view of FIG. 5.

Referring to FIGS. 5 and 6, the tilting mechanism 200 includes a photographing device 201, a sensor plate 210, a base 220, a rotation axis 230, a first photographing device supporting member 240, a second photographing device supporting member 250, a first electromagnet 261, a second electromagnet 262, a first permanent magnet 271, and a second permanent magnet (not shown).

In detail, the rotation axis 230, the first photographing device supporting member 240, and the second photographing device supporting member 250 are disposed on the base 220.

The base 220 is formed in a nearly flat plate shape, and the rotation axis 230 is formed to protrude in the middle of the base 220. The rotation axis 230 is formed in a nearly spherical joint shape. That is, a pillar having a predetermined cylinder shape is formed, and a spherical axis is formed on the pillar. Thus, the photographing device 201 disposed on the sensor plate 210 can be freely tilted in all directions by the rotation axis 230 having a spherical joint shape.

In the example, the first photographing device supporting member 240 and the second photographing device supporting member 250 are disposed perpendicular to each other on an end portion of the base 220. Both an upper surface 240b of the first photographing device supporting member 240 and an upper surface 250b of the second photographing device supporting member 250 are formed to be nearly flat, so that the sensor plate 210 is mounted flatly thereon. That is, when no force is applied to the sensor plate 210, the sensor plate 210 is mounted on the flat upper surfaces 240b and 250b of the first photographing device supporting member 240 and the second photographing device supporting member 250. Accordingly, the photographing device 201 may be disposed to be parallel to a plane perpendicular to the optical axis C of the lens group 111, that is, to be parallel to the base 220.

In the example, holes 240a and 250a are respectively formed in the first photographing device supporting member 240 and the second photographing device supporting member 250. A first elastic member 241 and a second elastic member 251 are disposed in the holes 240a and 250a, respectively. That is, end portions of the first elastic member 241 and the second elastic member 251 are respectively coupled with the holes 240a and 250a, and the other end portions of the first elastic member 241 and the second elastic member 251 are coupled with a lower surface of the sensor plate 210. The first elastic member 241 and the second elastic member 251 apply a predetermined elastic force in a direction the sensor plate 210 is pulled, so that the photographing device 201 and the base 220 are parallel to each other.

In the example, the first electromagnet 261 and the second electromagnet 262 are disposed on the other end portions of the base 220, that is, on opposite end portions of the end portions where the first photographing device supporting member 240 and the second photographing device supporting member 250 are disposed. Here, an electromagnet has a characteristic in which when current is applied, the electromagnet is magnetized, and when current supply is stopped, the electromagnet returns to its original condition in which the electromagnet is not magnetized. The electromagnet is different from a permanent magnet that constantly maintains magnetism, regardless of current supply. The first electromagnet 261 and the second electromagnet 262 apply a predetermined magnetic force in a direction the photographing device 201 is pulled, so that the photographing device 201 is tilted to the base 220.

In the example, the sensor plate 210 is mounted on the rotation axis 230, the first photographing device supporting member 240, and the second photographing device supporting member 250. The photographing device 201 is disposed on the sensor plate 210. Wiring lines 211 are connected to a side portion of the photographing device 201. In detail, the sensor plate 210 is formed in a nearly flat plate shape, and a groove 210a is formed in the middle of the lower surface of the sensor plate 210 to contact the rotation axis 230. The rotation axis 230 is slightly inserted into the groove 210a, and the sensor plate 210 and the photographing device 201 can tilt about the rotation axis 230.

The first permanent magnet 271 is disposed on the lower surface of the sensor plate 210 so as to face the first electromagnet 261, and the second permanent magnet (not shown) is disposed on the lower surface of the sensor plate 210 so as to face the second electromagnet 262.

Hereinafter, an operation of the tilting mechanism 200 according to an embodiment of the present invention will be described in detail.

Figure 7:
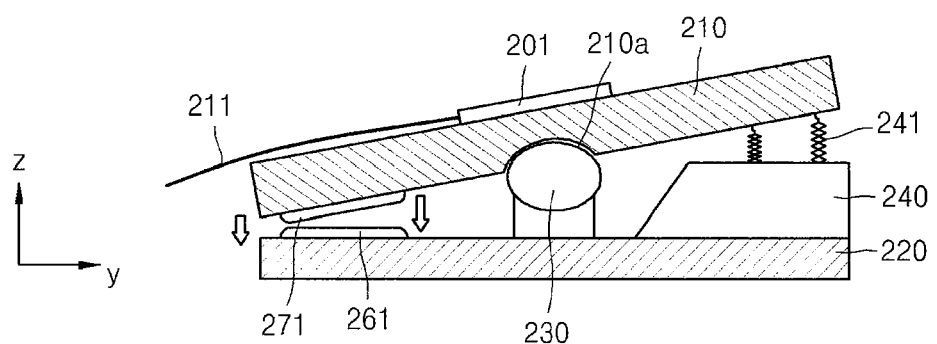
FIG. 7 illustrates an example when a sensor plate and a photographing device are tilted to a base.

FIG. 6 illustrates an example when the sensor plate 210, the photographing device 201, and the base 220 are parallel to one another. FIG. 7 illustrates an example when the sensor plate 210 and the photographing device 201 are tilted to the base 220.

Referring to FIG. 6, when current is not applied to the first electromagnet 261, the sensor plate 210, the photographing device 201 disposed on the sensor plate 210, and the base 200 are parallel to one another. In this state, the first elastic member 241 applies a predetermined elastic force in a direction the sensor plate 210 is pulled, and thus the photographing device 201 and the base 220 are parallel to each other.

In this state, in order to realize an out-focusing effect, current is applied to the first electromagnet 261. That is, when current is applied to the first electromagnet 261 so that magnetism occurs between the first electromagnet 261 and the first permanent magnet 271, the first electromagnet 261 and the first permanent magnet 271 attract each other as illustrated in FIG. 7, and the sensor plate 210 is tilted about the rotation axis 230. Accordingly, a focus is adjusted on a part of the photographing device 201, thereby realizing the out-focusing effect.

When current supply to the first electromagnet 261 is stopped, the magnetism occurring between the first electromagnet 261 and the first permanent magnet 271 stops. Then, the sensor plate 210, the photographing device 201 disposed on the sensor plate 210, and the base 220 become parallel to one another again by the elastic force of the first elastic member 241.

In the example of FIG. 7, the first electromagnet 261 is disposed on the base 220, and the first permanent magnet 271 is disposed on the sensor plate 210. In other examples, the first permanent magnet 271 may be disposed on the base 220, and the first electromagnet 261 may be disposed on the sensor plate 210. In still other examples, electromagnets may be disposed on both the base 220 and the sensor plate 210.

As such, as shown in FIG. 6, tilting of a YZ plane of the sensor plate 210 on its x-axis may be performed by the rotation axis 230, the first photographing device supporting member 240, the first elastic member 241, the first electromagnet 261 and the first permanent magnet 271.

Although not shown in FIGS. 6 and 7, the aforementioned operation principle may be applied to the rotation axis 230, the second photographing device supporting member 250, the second elastic member 251, the second electromagnet 262 and the second permanent magnet (not shown), so an XZ plane of the sensor plate 210 may tilt on its y-axis.

That is, the tilting of the YZ plane of the sensor plate 210 on its x-axis and the tilting of the XZ plane of the sensor plate 210 on its y-axis may be performed independently from each other. Furthermore, current is applied to the first electromagnet 261 and the second electromagnet 262 at the same time by controlling the amount of the applied current, so that out-focusing can be performed according to a desired position of the photographing device 201.

Regardless of an optical characteristic of a camera lens, an out-focusing effect can be realized by tilting a photographing device about a plane perpendicular to an optical axis of a lens group.

Figure 8:
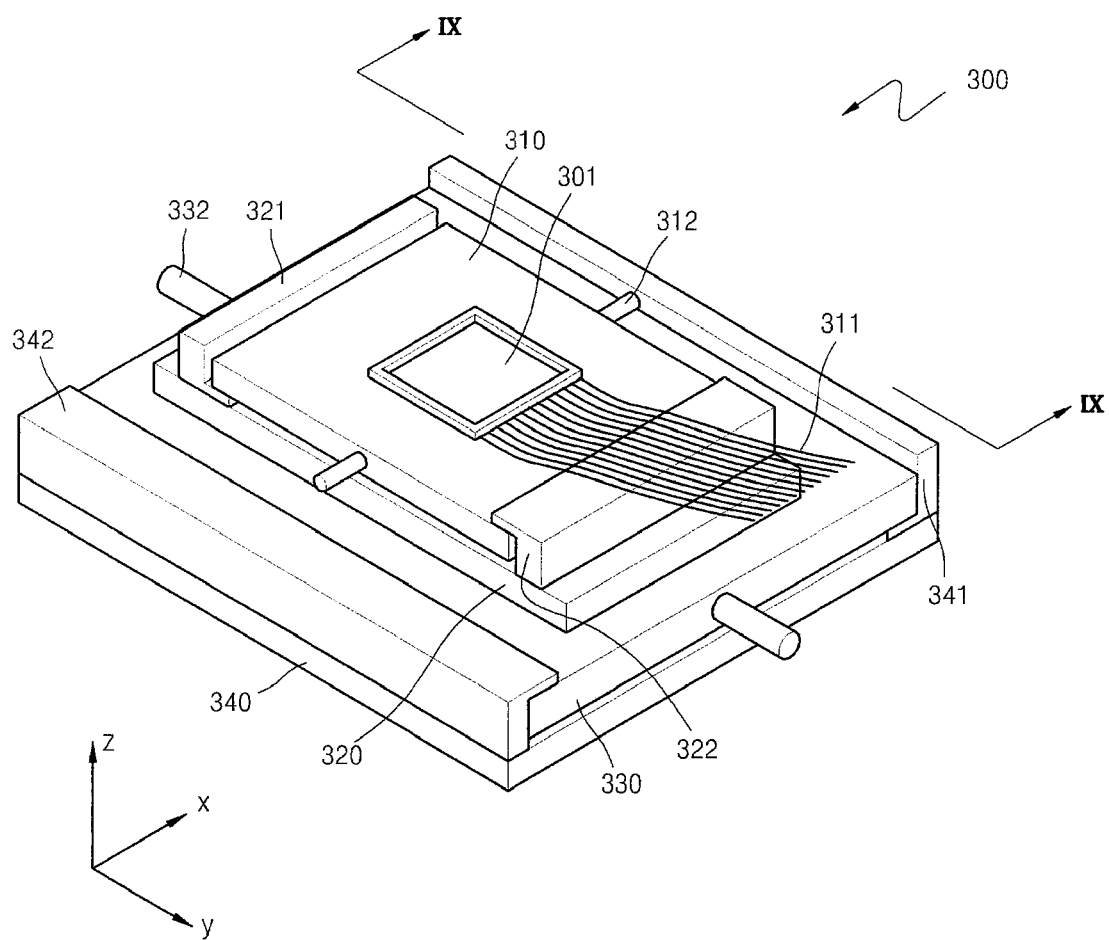
FIG. 8 is an example of an exploded perspective view illustrating a tilting mechanism of a digital image processing apparatus, according to another embodiment of the present invention.
Figure 9:
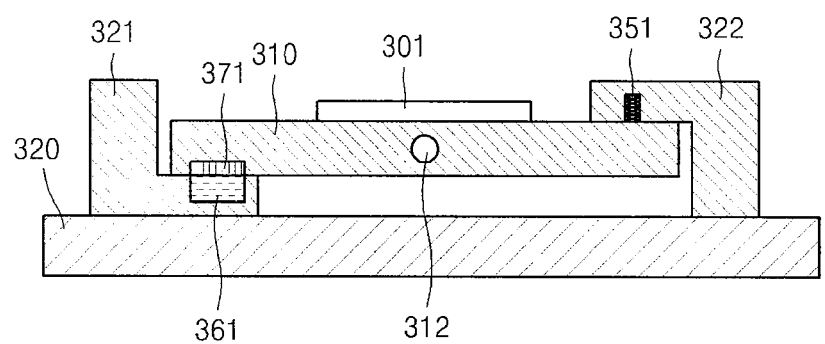
FIG. 9 is an example of a cross-sectional view of FIG. 8.

FIG. 8 is an example of an exploded perspective view illustrating a tilting mechanism 300 of a digital image processing apparatus, according to another embodiment of the present invention. FIG. 9 is a cross-sectional view of FIG. 8.

Referring to FIGS. 8 and 9, the tilting mechanism 300 according to the example includes a photographing device 301, a first sensor plate 310, a first base 320, a first photographing device supporting member 321, a second photographing device supporting member 322, a first electromagnet 361, and a first permanent magnet 371. The tilting mechanism 300 also includes a second sensor plate 330, a second base 340, a third photographing device supporting member 341, a fourth photographing device supporting member 342, a second electromagnet (not shown) and a second permanent magnet (not shown).

In detail, the first photographing device supporting member 321 and the second photographing device supporting member 322 are disposed on the first base 320.

The first base 320 is formed in a nearly flat plate shape, and the first photographing device supporting member 321 and the second photographing device supporting member 322 protrude on both end portions of the first base 320. The first photographing device supporting member 321 is formed in a nearly "L" shape, and the second photographing device supporting member 322 is formed in a nearly upside down "L" shape.

In the example, the photographing device 301 is disposed on the first sensor plate 310. Wiring lines 311 are connected to a side portion of the photographing device 301. The first sensor plate 310 is formed in a nearly flat plate shape, and a rotation axis 312 is formed in both side portions of the first sensor plate 310 to protrude therefrom. The rotation axis 312 is inserted into holes (not shown) formed in the digital image processing apparatus. Accordingly, the first sensor plate 310 and the photographing device 301 disposed on the first sensor plate 310 may be formed to be tilted about the rotation axis 312.

The first sensor plate 310 is disposed between the first photographing device supporting member 321 and the second photographing device supporting member 322. That is, a lower part of an end portion of the first sensor plate 310 contacts the first photographing device supporting member 321, and at the same time, an upper part of the other end portion of the first sensor plate 310 contacts the second photographing device supporting member 322.

The first electromagnet 361 and the first permanent magnet 371 are disposed in the lower part of an end portion of the first sensor plate 310 and the first photographing device supporting member 321, respectively. The first electromagnet 361 applies a predetermined magnetic force in a direction the first electromagnet 361 moves away from the first base 320, so that the first sensor plate 310 may be tilted to the first base 320.

In the examples of FIGS. 8 and 9, the first electromagnet 361 is disposed in the first photographing device supporting member 321, and the first permanent magnet 371 is disposed in the first sensor plate 310. In other examples, the first permanent magnet 371 may be disposed in the first photographing device supporting member 321, and the first electromagnet 361 may be disposed in the first sensor plate 310. Furthermore, electromagnets may be disposed in both the first photographing device supporting member 321 and the first sensor plate 310.

A first elastic member 351 may be formed between the upper part of the other end portion of the first sensor plate 310 and the second photographing device supporting member 322, which contact each other. The first elastic member 351 applies a predetermined elastic force in a direction the first sensor plate 310 is pulled, so that the first sensor plate 310 and the first base 320 may be parallel to each other.

The first sensor plate 310, the first base 320, the first photographing device supporting member 321, the second photographing device supporting member 322, the first electromagnet 361 and the first permanent magnet 371 perform tilting of the first sensor plate 310 to the first base 320, that is, tilting of a YZ plane in FIG. 8.

Next, the third photographing device supporting member 341 and the fourth photographing device supporting member 342 are disposed on the second base 340.

The second base 340 is formed in a nearly flat plate shape, and the third photographing device supporting member 341 and the fourth photographing device supporting member 342 protrude on both end portions of the second base 340. The third photographing device supporting member 341 is formed in a nearly "L" shape, and the fourth photographing device supporting member 342 is formed in a nearly upside down "L" shape.

The second sensor plate 330 is formed in a nearly flat plate shape, and a rotation axis 332 is formed in both side portions of the second sensor plate 330 to protrude therefrom. The rotation axis 332 is inserted into holes (not shown) formed in the digital image processing apparatus. Accordingly, the second sensor plate 330 may be disposed to be tilted about the rotation axis 332. The first base 320, and the elements formed thereon are disposed on the second sensor plate 330.

The second sensor plate 330 is disposed between the third photographing device supporting member 341 and the fourth photographing device supporting member 342. That is, the lower part of an end portion of the second sensor plate 330 contacts the third photographing device supporting member 341, and at the same time, the upper part of the other end portion of the second sensor plate 330 contacts the fourth photographing device supporting member 342.

The second electromagnet (not shown) and the second permanent magnet (not shown) are disposed in the lower part of an end portion of the second sensor plate 330 and the third photographing device supporting member 341, which contact each other, respectively. The second electromagnet (not shown) applies a predetermined magnetic force in a direction the second electromagnet (not shown) moves away from the second sensor plate 330, so that the second sensor plate 330 may be tilted to the second base 340.

In the example, the second electromagnet (not shown) is disposed in the third photographing device supporting member 341, and the second permanent magnet (not shown) is disposed in the second sensor plate 330. In other examples, the second permanent magnet (not shown) may be disposed in the third photographing device supporting member 341, and the second electromagnet (not shown) may be disposed in the second sensor plate 330. Furthermore, electromagnets may be disposed in both the third photographing device supporting member 341 and the second sensor plate 330.

A second elastic member (not shown) may be interposed between the upper part of the other end portion of the second sensor plate 330 and the fourth photographing device supporting member 342. The second elastic member applies a predetermined elastic force in a direction the second sensor plate 330 is pulled, so that the second sensor plate 330 and the second base 340 may be parallel to each other.

The second sensor plate 330, the second base 340, the third photographing device supporting member 341, the fourth photographing device supporting member 342, the second electromagnet (not shown), and the second permanent magnet (not shown) perform tilting of the second sensor plate 330 to the second base 340, that is, tilting of a XZ plane in FIG. 8.

Hereinafter, an operation of the tilting mechanism 300, according to another example, will be described in detail.

Figure 10:
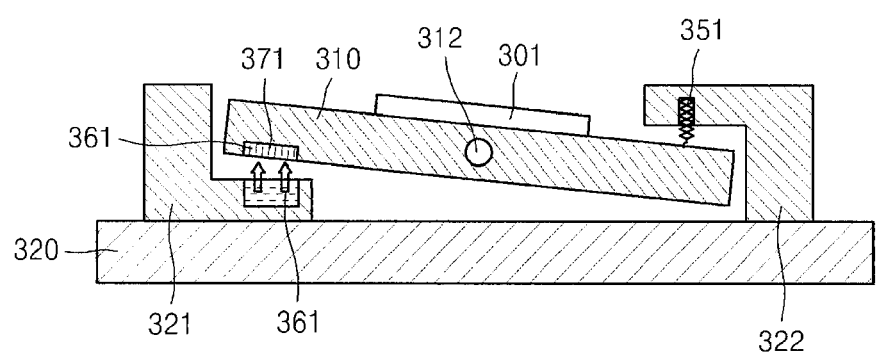
FIG. 10 illustrates an example of when a first sensor plate and a photographing device are tilted to a first base.

FIG. 9 illustrates an example when the first sensor plate 310, the photographing device 301, and the first base 320 are parallel to one another. FIG. 10 illustrates an example when the first sensor plate 310 and the photographing device 301 are tilted to the first base 320.

Referring to FIG. 9, when current is not applied to the first electromagnet 361, the first sensor plate 310, the photographing device 301 disposed on the first sensor plate 310, and the first base 320 are parallel to one another. In this state, the first elastic member 351 applies a predetermined elastic force in a direction the first sensor plate 210 is pulled, and thus the first sensor plate 310 and the photographing device 301 are parallel to the first base 320.

In this state, in order to realize an out-focusing effect, current is applied to the first electromagnet 361. That is, when current is applied to the first electromagnet 361 so that repulsion acts between the first electromagnet 361 and the first permanent magnet 371, the first electromagnet 361 and the first permanent magnet 371 repel each other, as illustrated in FIG. 10, and the first sensor plate 310 is tilted about the rotation axis 312. Accordingly, a focus is adjusted on a part of the photographing device 301, thereby realizing the out-focusing effect.

When current supply to the first electromagnet 361 is stopped, the repulsion acting between the first electromagnet 361 and the first permanent magnet 371 stops. Then, the first sensor plate 310 and the first base 320 become parallel to each other again by the elastic force of the first elastic member 351.

As such, tilting of an XZ plane of the first sensor plate 310 to the first base 320 may be performed by the first sensor plate 310, the first base 320, the first photographing device supporting member 321, the second photographing device supporting member 322, the first electromagnet 361 and the first permanent magnet 371.

Although not shown in FIGS. 9 and 10, tilting the second sensor plate 330 to the second base 340, that is, tilting of an XZ plane of the second sensor plate 330 on its y-axis may be performed by the second sensor plate 330, the second base 340, the third photographing device supporting member 341, the fourth photographing device supporting member 342, the second electromagnet (not shown), and the second permanent magnet (not shown) by applying the aforementioned operation principle.

That is, the tilting of a YZ plane of the first sensor plate 310 on its x-axis and the tilting of a XZ plane of the second sensor plate 330 on its y-axis may be performed independently from each other. Furthermore, current is applied to the first electromagnet 361 and the second electromagnet (not shown) at the same time by controlling the amount of the applied current, so that out-focusing can be performed according to the photographing device 301.

According to the present invention, regardless of an optical characteristic of a camera lens, an out-focusing effect can be realized by tilting a photographing device to a plane perpendicular to an optical axis of a lens group.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A digital image processing apparatus comprising:
   a lens; and
   a photographing device which generates data about an image from light which has passed through the lens, wherein the photographing device tilts about a plane perpendicular to an optical axis of the lens;
   a base formed to face the photographing device;
   one elastic member interposed between the photographing device and the base; and
   a pair of magnetic members, wherein one member is disposed on the surface of the photographing device and the other member is disposed on the base, the pair of magnetic members face each other;
   another pair of magnet members, wherein one member of the another pair of magnetic member is disposed on the surface of the photographing device and the other member of the another pair of magnet members is disposed on the base, the another pair of magnetic members face each other;
   another elastic member which applies an elastic force in a direction to bring the photographing device to return to an original position of the photographing device; and
   wherein the pair of magnet members tilts the photographing device about a first plane perpendicular to the base and the another pair of magnet members tilts the photographing device about a second plane perpendicular to the base.

2. The digital image processing apparatus of claim 1, wherein the photographing device is tilted about the plane perpendicular to the optical axis of the lens so as to control a range of a focus area formed on the photographing device.

3. The digital image processing apparatus of claim 1, wherein the pair of magnetic members apply a magnetic force so that the photographing device is tilted toward the base.

4. The digital image processing apparatus of claim 3, wherein one member of the pair of magnetic members is an electromagnet, and the other member of the pair of magnetic members is a permanent magnet; and wherein the photographing device is tilted toward the base by the application of current to the electromagnet.

5. The digital image processing apparatus of claim 1, wherein the elastic member applies an elastic force in a direction to bring the photographing device to return to a non-tilted position of the photographing device.

6. A digital image processing apparatus comprising:
   a base;
   a rotation axis disposed on the base;
   a photographing device supporting member disposed on the base;
   a sensor plate disposed on the rotation axis and the photographing device supporting member so as to be parallel to the base; and
   a photographing device mounted on the sensor plate and converting light energy into an electrical signal, wherein the sensor plate and the photographing device tilt toward the base;
   a pair of magnetic members, wherein one member is disposed on the surface of the photographing device and the other member is disposed on the base, the pair of magnetic members face each other, wherein the pair of magnetic members apply a magnetic force to tilt the photographing device;
   an elastic member is disposed between the photographing device supporting member and the sensor plate, and the elastic member applies an elastic force in a direction to bring the photographing device to return to a non-tilted position of the photographing device;
   another pair of magnet members, wherein one member of the another pair of magnetic member is disposed on the surface of the photographing device and the other member of the another pair of magnet members is disposed on the base, the another pair of magnetic members face each other; and
   another elastic member wherein the another elastic member applies an elastic force in a direction to bring the photographing device to return to a non-tilted position of the photographing device;
   wherein the pair of magnet members tilts the photographing device about a first plane perpendicular to the base and the another pair of magnet members tilts the photographing device about a second plane perpendicular to the base.

7. The digital image processing apparatus of claim 6, wherein the photographing device tilts toward the base, so as to control a range of a focus area formed on the photographing device.

8. The digital image processing apparatus of claim 6, wherein the rotation axis is formed in a spherical joint shape, and the sensor plate and the photographing device tilt about the rotation axis.

9. The digital image processing apparatus of claim 6, wherein the photographing device supporting member is disposed to contact a part of the sensor plate.

10. The digital image processing apparatus of claim 6, wherein one of the pair of magnetic members is an electromagnet, and the other one of the pair of magnetic members is a permanent magnet; and wherein when current is applied to the electromagnet, the photographing device is tilted toward the base by magnetism occurring between the electromagnet and the permanent magnet.

* * * * *